Patented June 4, 1940

2,203,400

UNITED STATES PATENT OFFICE 2,203,400

PROCESS OF PRODUCING VITAMIN E CONCENTRATE

John S. Andrews, St. Paul, Minn., assignor to General Mills, Inc., a corporation of Delaware No Drawing. Application September 24, 1938, Serial No. 231,544

4 Claims. (Cl. 167—81)

The present invention relates to a process for hydrogenating and extracting wheat germ oil and more particularly to a process of converting a portion of the glycerides present in such oil from the unsaturated state to the saturated state whereby vitamin E contained in such oil is more readily extractable and rendered less susceptible to oxidation than is the case with unhydrogenated oil.

The principal object of my invention is to provide an effective and economical process of producing a vitamin E and antioxidant concentrate from wheat germ oil and at the same time permit this concentration without oxidative destruction of the vitamin E or natural antioxidant.

Another object of my invention is to hydrogenate glycerides present in wheat germ oil so that the glycerides are rendered less soluble in an extraction medium thereby permitting a more thorough separation of the vitamin E and antioxidant from the glycerides of the wheat germ oil.

A further object of my invention is to provide a process of treating wheat germ oil which comprises hydrogenating the oil to convert a portion of the glycerides present in such oil from the unsaturated state to the saturated state whereby vitamin E contained in such oil is more readily extractible and rendered less susceptible to oxidation than is the case with unhydrogenated oil.

A still further object of my invention is to hydrogenate glycerides present in wheat germ oil so that the oil has a much lower tendency to form emulsions with the extraction solvent during the extraction process than the unhydrogenated oil thereby facilitating the operations involved in practicing the extraction.

These and other objects and advantages of my invention will be more readily apparent from a consideration of the following detailed specification in conjunction with the appended claims.

Broadly, my invention comprises introducing hydrogen gas into a vessel containing wheat germ oil and a catalyst, such as finely divided palladium, platinum, or nickel while agitating and heating the oil, until the desired degree of hydrogenation of the oil has taken place. The warm or hot oil is then filtered to remove the catalyst therefrom and upon cooling, the oil congeals to form a semisolid or solid mass. This mass is then heated to almost the boiling point of an extraction medium, such as methanol, or ethanol, or propanol, and extracted in any desired manner with one of these extractants. The alcohol extractant containing the vitamin E and antioxidant is separated from the undissolved fat in any desired manner.

The alcoholic extract containing vitamin E and antioxidant is then cooled to about 0° C. whereupon undesirable materials which are inactive in vitamin E and antioxidant, such as sterols and glycerides, separate as solids from the alcoholic solution. The solids are then removed by filtration, and the filtrate freed from the alcohol by distillation, preferably in a vacuum. The residue from this distillation contains vitamin E and antioxidant which has a vitamin E potency that is about 20 to 50 times greater than that of the original wheat germ oil.

The residue obtained from the above distillation and containing the concentrated vitamin E may be used without further treatment, or if desired, it may be subjected to further concentration treatment such as saponification and extraction.

The following specific example will serve to illustrate and explain my invention. 1000 grams of wheat germ oil and 1.3 grams of palladium chloride, as a catalyst, were placed in a hydrogenation flask and hydrogen introduced into the flask and maintained at a pressure of from 1 to 2 atmospheres. The mixture in the flask was continuously shaken and through external heating was kept at a temperature of from 100° C. to 200° C. The oil was reduced by this operation and the hydrogenation was continued until the iodine number of the oil dropped from approximately 118 to 65 to 70. The oil was then filtered through a warm filter funnel to remove the catalyst. Bioassay of this filtered product showed that no loss in vitamin E activity resulted from the hydrogenation process.

300 grams of the hydrogenated wheat germ oil was then placed in an extraction flask fitted with a tube for introducing vapors of methanol below the surface of the oil, a reflux condenser and a syphon tube extending to just above the surface of the oil. 500 cubic centimeters of methanol was placed in a second flask which was connected to the extraction flask containing the hydrogenated oil, through the introduction and syphon tubes. The methanol was heated to its boiling point, and the vapors conducted through the introduction tube into the oil which was maintained at a temperature sufficient to cause slight refluxing of the methanol. When most of the alcohol had thus been distilled from the second flask, the distillation was stopped, and the extraction mixture allowed to separate into two layers in the extraction flask. The top, methanol layer, was then returned to the distillation flask through the syphon tube and the process repeated several times to thoroughly extract the vitamin E and antioxidant from the hydrogenated oil.

The methanol extract, obtained as described above, was chilled to 0° C. for 18 hours thereby causing the separation of considerable quantities of solid material. This solid was filtered off from the cold solution and the filtrate was then freed from the alcohol by distilling in a vacuum. The residue from this distillation weighed 9.5 grams, and thus amounted to 3.17% of the original hydrogenated oil. Bioassay showed this material to have vitamin E activity of 30 times the potency of the original oil.

A second specific example to illustrate the antioxidant properties of the concentrate is as follows. 950 grams of wheat germ oil was placed in a hydrogenation flask and treated with .4%, by weight, of nickel in the form of a catalyst. The nickel catalyst was prepared by adding 4 parts of filter cel (diamatecous earth preparation) to each part of nickel and the nickel was precipitated as a basic carbonate by the addition of sufficient soda-ash. The resulting suspension was filtered, air dried, and gaseous hydrogen was passed through the dried precipitate while maintaining the precipitate at a temperature of 400° C. to 450° C. One part of this finished catalyst was suspended in four parts of wheat germ oil. This suspension was added to the above 950 grams of wheat germ oil in amounts sufficient to produce .4% of nickel. The flask was then filled with hydrogen, while maintaining the temperature of the flask at 100° C. to 150° C. and at a pressure of hydrogen of from 2 to 15 cm. of Hg, and the flask was shaken. This hydrogenation process was continued until the iodine number had dropped from an original value of 119.5 to 46.6. The hydrogenated wheat germ oil was separated from the catalyst, by filtration. The resulting product had a melting point of 45.5° C.

100 grams of this oil was then placed in a separatory funnel, and the funnel was immersed in a water bath at 60° C. When the oil had attained approximately this temperature, 100 cubic centimeters of methanol heated to almost its boiling point, was added and the mixture shaken vigorously. The funnel and its contents was kept in the water bath while the layers of methanol solution and oil were allowed to separate. The oil layer was then drawn off, and the extraction repeated twice using fresh quantities of methanol. The three resulting methanol extracts were then combined and chilled overnight at 0° C. The nearly colorless solid material which was thereby separated was filtered off and the filtrate freed from methanol by distillation. Final traces of the solvent were removed by heating the residue remaining from distillation of the filtrate in a vacuum. The resultant product was a slightly yellow waxy solid and constituted 2.6%, by weight, of the original wheat germ oil, and had an iodine number of 39.5, and saponification value 150.

The antioxidant properties of the above product were determined by dissolving .5%, by weight, in a fat such as lard or vegetable shortening, and determining the time required for the development of rancidity when air is blown through the fat while the fat is maintained at a temperature of approximately 100° C. according to the method described by King, Roschen and Irwin in the Journal of Oil and Soap, page 105, volume 10, June 1933.

The following table shows the results obtained by the use of the above-described method:

| | Description of sample | Stability in hours |
|---|---|---|
| 1 | Vegetable shortening | 11.5 |
| 2 | Vegetable shortening plus .5% of above wheat germ oil concentrate | 40.7 |
| 3 | Lard | 26.5 |
| 4 | Lard plus .5% of above wheat germ oil concentrate | 44.5 |

My improved process is economical in that the alcoholic extractant used therein may be recovered substantially without loss since the extraction process may be practiced in a closed system or a system which condenses may be incorporated to prevent loss of the alcohol to the atmosphere. Also, the alcohol is readily removed from the extracted material by distillation.

My improved vitamin concentrate product is a solid mixture of glycerides and non-saponifiable matter including antioxidant and vitamin E which differs essentially from the original wheat germ oil in the existence of materially lower amounts of glycerides in a more saturated condition. Thus the product presents a highly concentrated vitamin and antioxidant preparation which can be directly utilized for either antioxidant or vitamin properties.

Any odor from hydrogenation may be removed from my improved product by treating it with steam in a vacuum as usually practiced in the commercial art. Such treatment may be desirable when it is desired to directly use the vitamin concentrate in foods and in medicinal preparations.

While in the above-described specific example, a batch process of hydrogenating wheat germ oil has been described and a specific pressure of hydrogen has been stated, it will be understood that the oil may be hydrogenated by other means such as by continuously passing hydrogen gas through the oil, and the pressure of hydrogen may be varied within considerable limits.

In many processes for concentrating vitamins and other materials from oils, glycerides are preliminarily converted to other fatty derivatives prior to the separation of the desired substances. In such cases, the major by-product is some form of the fatty material, such as fatty acids or soaps, other than the original glycerides of the oil. Reconversion of these by-product fatty materials to glycerides can only be carried out at some expense and with some loss. In the herein described extraction process, the glycerides remain unaltered aside from partial conversion of the unsaturated to the saturated form.

My process is also effective for separating a substantial portion of the sterols from the vitamin E and antioxidant substances occurring in wheat germ oil. In the extraction of the hydrogenated oil with hot alcohol, much of the sterols are simultaneously extracted along with part of the glycerides and the vitamin E and antioxidant. In the cold alcohol, however, the sterols are only sparingly soluble. Hence, upon chilling the alcohol extract, sterols are precipitated together with the glycerides and are removed by the filtration. This step in the process thereby constitutes a material contribution to the concentration of the vitamin E and antioxidant since a large portion of the non-saponifiable material of wheat germ oil is a mixture of several sterols.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims in which the intent is to set forth all the novelty over the prior art.

I claim as my invention:

1. A process of producing a solid, stable vitamin E concentrate and antioxidant from wheat germ oil and in which the original vitamin E activity of the wheat germ oil has been increased from 20 to 50 fold which comprises introducing a catalyst into wheat germ oil, and hydrogenating the oil in the presence of the catalyst, while agitating the oil and heating said oil and catalyst to a temperature of not more than 200° C. whereby the oil is partially hydrogenated and a portion of the glycerides present in such oil are converted from the unsaturated state to the saturated state, filtering the warm oil to remove the catalyst therefrom, extracting the hydrogenated wheat germ oil with alcohol, to produce an alcoholic extract containing vitamin E and antioxidant, then cooling the alcoholic extract to a sufficiently low temperature to cause the separation of sterols and glycerides therefrom, then filtering the solution while cold to remove the sterols and glycerides, and finally removing excess alcohol from the vitamin concentrate by distilling off said alcohol.

2. A process as defined in claim 1, in which hydrogen gas is introduced into said oil and continuously passed through said oil while heating and agitating the oil.

3. A process as defined in claim 1, in which the vitamin concentrate is further concentrated by saponification, and extraction.

4. In the process of producing a stable vitamin E concentrate and antioxidant from wheat germ oil and in which the original vitamin E activity of the wheat germ oil has been increased from 20 to 50 fold the steps which comprise introducing a catalyst into wheat germ oil and hydrogenating the oil in the presence of the catalyst while agitating the oil and catalyst, heating said oil and catalyst to a temperature of not more than 200° C. whereby the oil is partially reduced and a portion of the glycerides present in such oil are converted from the unsaturated state to the saturated state, filtering the warm oil to remove the catalyst therefrom, and extracting the hydrogenated wheat germ oil with alcohol to produce an alcoholic extract containing vitamin E and antioxidant.

JOHN S. ANDREWS.